2,801,925

METHOD OF PROCESSING MARASCHINO CHERRIES

George A. Fisher, Selinsgrove, Pa.

No Drawing. Application January 9, 1952,
Serial No. 265,723

6 Claims. (Cl. 99—154)

Broadly speaking, the product known as maraschino cherries is made by impregnating tree-ripened cherries with sugar in (usually aqueous) solution. It is necessary, however, first to treat the cherries with a preservative, such as sulphur-dioxide, and then to remove all but a tiny, legally-limited residue of the preservative, before starting the sugar impregnation. It is impractical, of course, to utilize immature fruit for this product, primarily because the size and flavor of cherries, until the fruit is fully ripened, are such as to render such immature fruit substantially worthless for the intended use.

All cherries, when tree-ripened, are soft almost to the point of mushiness, especially "sours," of which Montmorency is a variety, and is even softer and less firm in body texture than are the varieties known as "sweets"; yet the Montmorency cherry is considered by most people to have a better flavor, and is more plentiful in available supply than any other variety of cherry suitable for maraschino production. It is well known that "sweets"—and, to an even more drastic degree, "sours"—when flooded with sugar solution initially in concentrations on the order of that desired for final impregnation, that is, within the range between 30% and saturation, will be collapsed by the resultant osmotic exchange, since the rate of flow of the fluids naturally present in the fruit, into the liquid in which the fruit is submerged, will radically exceed the rate of flow of the immersing liquid into the body of the fruit. Consequently, it has been the universal practice, prior to my invention, to immerse cherries initially, after impregnation with the said preservative and subsequent leaching, in a sugar solution of very low concentration on the order, for instance, of 25%. According to conventional practice, the cherries have been allowed to stand in this dilute solution for one to two days, and then the concentration of the solution is raised by 6%, the cherries are allowed to stand in this solution for a further period of from one to two days, and then the concentration is again increased by another 6% and so on until an optimum concentration of, for instance, 22° Baumé is attained. After a final soaking in this highly concentrated solution for at least forty-eight hours, the cherries are drained, and are then ready for packing or for use in such other procedure as may be desired.

Thus it will be seen that, according to conventional practice, the sugar-impregnation of cherries has required a period of ten to fifteen days, with attention (increasing the sugar concentration of the flooding solution, four to six times during the process.

The leaching step, above referred to, has conventionally been accomplished by flowing fresh water over the cherries continuously for from twenty-four to seventy-two hours, depending upon the degree of removal of the preservative deemed to be necessary.

It has been found that some batches of maraschino cherries, produced in accordance with the above-described conventional procedure, develop an unsatisfactory flavor, referred to in the industry as a "tea taste"; and prior to my invention, the reason for this situation has not been understood and no effective cure or preventive practice has been offered to the industry.

The present invention is directed to the improvement of procedures followed in the production of maraschino cherries, primarily, but more broadly, in the sugar-impregnation of soft-bodied fruits, generally, whereby the time required for completion of the process is materially shortened, control of the residuum of preservative in the fruit is improved, and the development of "off-flavors" is effectively prevented, while the quality of the completed product is never deleteriously affected and is, in fact, in most cases substantially elevated.

My process has been developed primarily in connection with the preparation of maraschino cherries and will therefore be described in that application; but it is to be understood that the description is illustrative and not limitative, and that the process is applicable, with similar advantages, to the treatment of other soft-bodied fruits, vegetables and the like, so that change may be made in the specific steps and materials mentioned herein, without departing from my invention, so long as the scope of the appended claims is not violated.

It is my present belief that the so-called "tea taste" which sometimes develops in maraschino cherries is a result of oxidation, and that the reason why the product of my process does not develop a "tea taste," even in isolated instances, lies in the fact that air, along with other gases in the fruit, is extracted almost totally from the cells of the fruit before sugar-impregnation thereof is begun.

According to my invention, tree-ripened cherries of any selected variety will be subjected to the conventional (or any other) treatment with a suitable preservative. Preferably, but not necessarily, the cherries will be surface-washed, and then, after separation into batches, they will be subjected to a subatmospheric pressure. Any convenient apparatus may be used throughout my process. The purpose of the vacuum step is to degasify the fruit, removing from the body thereof substantially all the air and other gases naturally present in the fruit meat and, at the same time, removing substantially all of the sulphur-dioxide or other fluid preservative with which the fruit has been impregnated by the treatment above mentioned.

Effective degasification of the fruit can be accomplished by subjecting the fruit to a degree of vacuum indicated by a 25-inch column of mercury for a period of from fifteen to thirty minutes at a temperature within the range from 120° to 140° F., and I presently consider these conditions to be optimum. Satisfactory results can be obtained, however, by working at lower temperatures if the degree of vacuum is increased. For instance, if a vacuum on the order of 29½ to 30 inches is used, the temperature may be held as low as 60° F. The fruit should be held under the selected conditions of temperature and pressure, however, for a period of not less than fifteen minutes, and usually not more than thirty minutes.

Now, without breaking the vacuum, the fruit is flooded, within the chamber or vessel in which the degasifying step has been carried out, with a sugar solution of the concentration desired for final sugar-impregnation of the fruit; and the vacuum is held, without substantial change in degree, for a substantial period such as, for instance, another fifteen minutes. This operation results in a partial degasification of the syrup, removing therefrom some of the dissolved air and, according to my present belief, a portion of the sulphur-dioxide osmotically absorbed by the syrup from the fruit. Because the fluid pressure within the fruit has been reduced, by the vacuumizing step, before the syrup is admitted thereto, the osmotic transfer rate is substantially equalized, so that, as a matter of fact, the fruit does not collapse when flooded with the concentrated sugar solution. I have found that concentrations within the range from 30% to saturation may be effectively used in this step, though I prefer to use a concentration between 50% and 70% and I presently believe a concentration of 54% to be optimum.

After the flooded fruit has been held under selected conditions of pressure and temperature, say a 25-inch vacuum at 130° F., for a selected period, say fifteen minutes, the vacuum is broken, and the fruit is allowed to stand in the flooding solution, at atmospheric pressure and at temperatures naturally decreasing to room temperature, say 70° F., for from twenty-four to seventy-two hours. During this period, it is found that the fruit becomes impregnated with the syrup to a degree in all respects comparable to that effected by the above-outlined conventional procedure.

It has been known, prior to my invention, that firm-bodied fibrous fruits, such as pineapples, apples, pears and the like, can be successfully flooded with sugar-solutions of high concentration for impregnation thereby, but all previous attempts to obtain similar results with soft-bodied fruits comparable to cherries have, so far as I am advised, been universally unsuccessful. For at least fifty years prior to my invention, the industry has, therefore, followed the conventional procedure described in the opening paragraphs of this specification, suffering the inconveniences and expense of that long-drawn-out procedure because, in spite of the obvious need for a "short-cut" process, the industry has been unable to conceive any means whereby high-concentration impregnation of such fruits could be attained without either following the conventional procedure or producing collapse of the fruit. By the apparently simple step of pre-vacuumizing and thus degasifying, the fruit, I have eliminated the necessity for gradually raising the syrup concentration through successive stages, as described above. At the same time, and as a result of the new procedure described herein, I have overcome the previously-unexplained and mysteriously-uncontrollable development of "off-flavors" in the finished product. Experimental batches of maraschino cherries, produced according to my process and then held under commercial conditions for periods of many months, have been found, when scientifically tested, to have maintained excellent flavors, with no single instance of "off-flavor" development.

As a corollary to this invention, I have found that, after the treating syrup has been drained from one batch of cherries, the syrup may be vacuumized, preferably under conditions of pressure and temperature analogous to those above recommended for degasification of the fruit; and thereby the syrup will be effectively reconditioned for reuse in the impregnation of further batches of fruit. Thus, by osmotic exchange, some quantity of preservative, such as sulphur-dioxide, will be absorbed in the flooding excess of syrup in which the fruit is soaked, until the concentration of sulphur-dioxide in such excess syrup equals or approaches that remaining in the fruit. Obviously, it would be unsatisfactory to reuse this syrup for another batch of fruit, since it would have substantially no capacity for further reducing the preservative-content of the fruit. When, however, the used syrup is vacuum-treated as above described, its said capacity is effectively regenerated and it may then be returned to the process with or without adjustment by addition of further sugar and/or solvent.

Sugar is, of course, the primary impregnating solid used in the preparation of maraschino cherries, and therefore I have referred only to sugar in the above description and in the appended claims. It is to be understood, however, that other flavoring and/or coloring materials may be used together with, or in substitution for, sugar in the process; and that the discovery upon which the invention disclosed herein is based, is just as useful in the impregnation of soft-bodied comestibles with other substances which, in osmotic exchange relation with such comestibles without preliminary degasification will tend to produce collapse of such comestibles. The word "sugar," therefore, wherever used herein, is intended to be interpreted to include such other substances.

I claim as my invention:

1. The method of treating cherries containing an artificially-added gaseous preservative, which comprises the steps of extracting a major portion of all gases contained within the fruit by subjecting the fruit to a subatmospheric pressure of at least that degree indicated by a 25-inch column of mercury and then, without preliminarily breaking the vacuum, flooding the fruit with a sugar solution of the concentration required for final impregnation of the fruit and within the range between 30% and saturation and at a temperature within the range from 60° F. to 140° F. not less than fifteen minutes after such flooding is started, and thereafter allowing the fruit to stand in such a sugar solution for approximately twenty-four hours.

2. The method of producing sugar impregnation of cherries which comprises the steps of subjecting the fruit to a vacuum on the order of 25 inches of mercury at a temperature of from 120° F. to 140° F., then flooding the fruit with a sugar solution of the concentration required for final impregnation of the fruit and within the range between 30% and saturation, breaking the vacuum not less than fifteen minutes after such flooding is started, and allowing the fruit to stand in such a solution for twenty-four to seventy-two hours.

3. The method of producing sugar impregnation of cherries which comprises the steps of subjecting the fruit to a vacuum on the order of 25 inches of mercury at a temperature of from 120° F. to 140° F., whereby the fruit is degasified, then flooding the fruit with a sugar solution of at least 30% concentration while maintaining such vacuum and temperature conditions for at least fifteen minutes to degasify such solution, then breaking the vacuum and allowing the fruit to stand in such a solution for at least approximately twenty-four hours.

4. The method of producing sugar impregnation of cherries which comprises the steps of subjecting the fruit to a vacuum on the order of 25 inches of mercury at a temperature of from 120° to 140° F., for a period of at least fifteen minutes whereby the fruit is degassified, then flooding the fruit with a sugar solution in concentration within the range of from 50% to 70% while maintaining such vacuum and temperature conditions for a period of at least fifteen minutes, then breaking the vacuum and allowing the fruit to stand in such a solution for at least approximately twenty-four hours.

5. The method of producing maraschino cherries which includes the steps of impregnating a first batch of tree-ripened cherries with sulphur dioxide, then washing the impregnated cherries lightly with water, then subjecting the cherries to a vacuum on the order of 25 to 30 inches of mercury for a period of at least fifteen minutes and at a temperature, variable inversely with respect to the degree of vacuum used, within the range from 60° to 140° F. to degasify the cherries, then, without preliminarily breaking the vacuum, flooding the cherries with a sugar solution in concentration of at least 30%, then breaking the vacuum and allowing the cherries to stand in such a solution for a period of at least twenty-four hours, and then draining the solution from the cherries.

6. The method of producing maraschino cherries which includes the steps of impregnating a first batch of tree-ripened cherries with sulphur-dioxide, then washing the impregnated cherries lightly with water, then subjecting the cherries to a vacuum on the order of 25 to 30 inches of mercury for a period of at least fifteen minutes and at a temperature, variable inversely with respect to the degree of vacuum used, within the range from 60° to 140° F. to degasify the cherries, then, without preliminarily breaking the vacuum, flooding the cherries with a sugar solution in concentration of at least 30%, then breaking the vacuum and allowing the cherries to stand in such a solution for a period of at least twenty-four hours, then draining the solution from the cherries, then subjecting the solution so drained from the cherries to a vacuum on the order of 25 to 30 inches of mercury for a period of at least fifteen minutes at a temperature, variable inversely with respect to the degree of vacuum used, within the range from 60° to 140° F., then adjusting the volume and concentration of such solution to optimum values by addition of fresh sugar and solvent, and then returning the solution, thus treated, to the process to flood a further batch of cherries immediately after degasification of such further batch of cherries.

References Cited in the file of this patent

UNITED STATES PATENTS

| | | |
|---|---|---|
| 1,560,396 | Navarre | Nov. 3, 1925 |
| 1,890,475 | Todd | Dec. 13, 1932 |
| 1,906,295 | Wickenden | May 2, 1933 |
| 2,494,258 | Nickol | Jan. 10, 1950 |
| 2,509,299 | Grom | May 30, 1950 |
| 2,509,633 | Flanzy | May 30, 1950 |